G. E. JACKSON.
BALING PRESS.
APPLICATION FILED OCT. 6, 1908. RENEWED SEPT. 7, 1910.

1,053,398.

Patented Feb. 18, 1913.
5 SHEETS—SHEET 1.

Inventor
G. E. Jackson

G. E. JACKSON.
BALING PRESS.
APPLICATION FILED OCT. 6, 1908. RENEWED SEPT. 7, 1910.

1,053,398.

Patented Feb. 18, 1913.
5 SHEETS—SHEET 4.

Witnesses
Cora M. Handy

Inventor
G. E. Jackson
By
Attorneys

G. E. JACKSON.
BALING PRESS.
APPLICATION FILED OCT. 6, 1908. RENEWED SEPT. 7, 1910.

1,053,398. Patented Feb. 18, 1913.
5 SHEETS—SHEET 5.

UNITED STATES PATENT OFFICE.

GEORGE E. JACKSON, OF NEWARK, ILLINOIS.

BALING-PRESS.

1,053,398.  Specification of Letters Patent.  Patented Feb. 18, 1913.

Application filed October 6, 1908, Serial No. 456,377. Renewed September 7, 1910. Serial No. 580,927.

*To all whom it may concern:*

Be it known that I, GEORGE E. JACKSON, citizen of the United States, residing at Newark, in the county of Kendall and State of Illinois, have invented certain new and useful Improvements in Baling-Presses, of which the following is a specification.

This invention comprehends certain new and useful improvements in presses for baling hay and the like and the invention has for its primary object a press which will be automatic in all of the various operations of compressing the material, forming it into a bale, feeding the wire around the bale and twisting the wire, and in which the operation will be a continuous one, the bales being automatically tied as they are compressed without losing a stroke of the compressing plunger or ram.

The invention also has for its object an improved mechanism of this character which is so arranged that the operation of feeding the wires up to the twisters and the subsequent operation of twisting the wires and cutting off the twisted end will be performed while the plunger or ram is at the forward or compressing end of its stroke. And a further object of the invention, is a simple, durable and efficient construction of baling press which will be positive in its action and so timed that no one part will ever interfere with the others, but all will work in harmony so that the machine may be fed a charge at each stroke of the ram without interfering with the action of the wire twisting mechanism, the entire operation, as above stated, being a continuous one.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawings in which:

Figures 1 and 1ª illustrate in side elevation the entire baling press, it being understood that Fig. 1ª represents the front portion of the press and is a continuation of Fig. 1; Fig. 7 is a detail top plan view, on an enlarged scale of a portion of the actuating mechanism hereinafter specifically described; Fig. 8 is a side elevation of such actuating mechanism including parts in addition to those shown in Fig. 7; and, Fig. 9 is a detail perspective view of one of the needle carrying arms and wire holders and the actuating mechanism for the latter.

Corresponding and like parts are referred to in the following description and indicated in all the views of the accompanying drawings by the same reference characters.

The framework of my improved press may be of any desired construction or design and is preferably mounted upon traveling wheels so that it may be drawn from place to place as desired; the rear traveling wheels being not shown in the drawing.

The numeral 1 designates the main drive shaft which extends transversely of the framework, as shown, and which may be driven in any desired way. In the present instance, I have illustrated the drive shaft 1 as equipped with a band wheel or pulley 2 around which the band or belt 3 extends, said belt leading from some suitable source of power (not shown).

4 designates the fly or balance wheel on the opposite end of the shaft 1 from the pulley 2.

The drive shaft 1 carries a spur pinion 5 which meshes with a relatively large gear wheel 6 on one end of a transverse shaft 7, said shaft being journaled on the framework of the press at the rear of the drive shaft 1. Spur pinions 8 and 9 are also carried by this counter shaft 7, said pinions meshing respectively with relatively large gear wheels 10 and 11. These gear wheels are connected together by a crank or wrist pin 13 in which the knuckle 14 of the pitman or connecting rod 15 is mounted so as to impart a reciprocating motion to the plunger or ram 16, as the said wheels 10 and 11 rotate.

In order to pack the hay into the compressing chamber of the press, I have provided a fork 17 which hangs down from the forward end of a rocking beam 18 fulcrumed intermediate of its ends on a transverse shaft 19 supported upon the press framework. The beam 18 is counterweighted at its rear end by some suitable means (not shown), so that it will automatically rock in a direction to raise the fork 17; in order to rock the beam 18 in the opposite direction to force the fork 17 down into the hay or other materials being baled, the said beam is provided at the rear of its pivot with a depending arm 20. This arm 20 is formed with a cam 21 and an upwardly extending recess in advance of the cam, the cam being designed for engagement by a roller 22 carried by the pitman or connecting rod 15, so that as the pitman reciprocates, it will force the fork 17 down into the hay on the rearward stroke of the plunger, and will permit the fork to swing upwardly and out of the hay upon the forward movement of the plunger.

Figures 1A, 2:
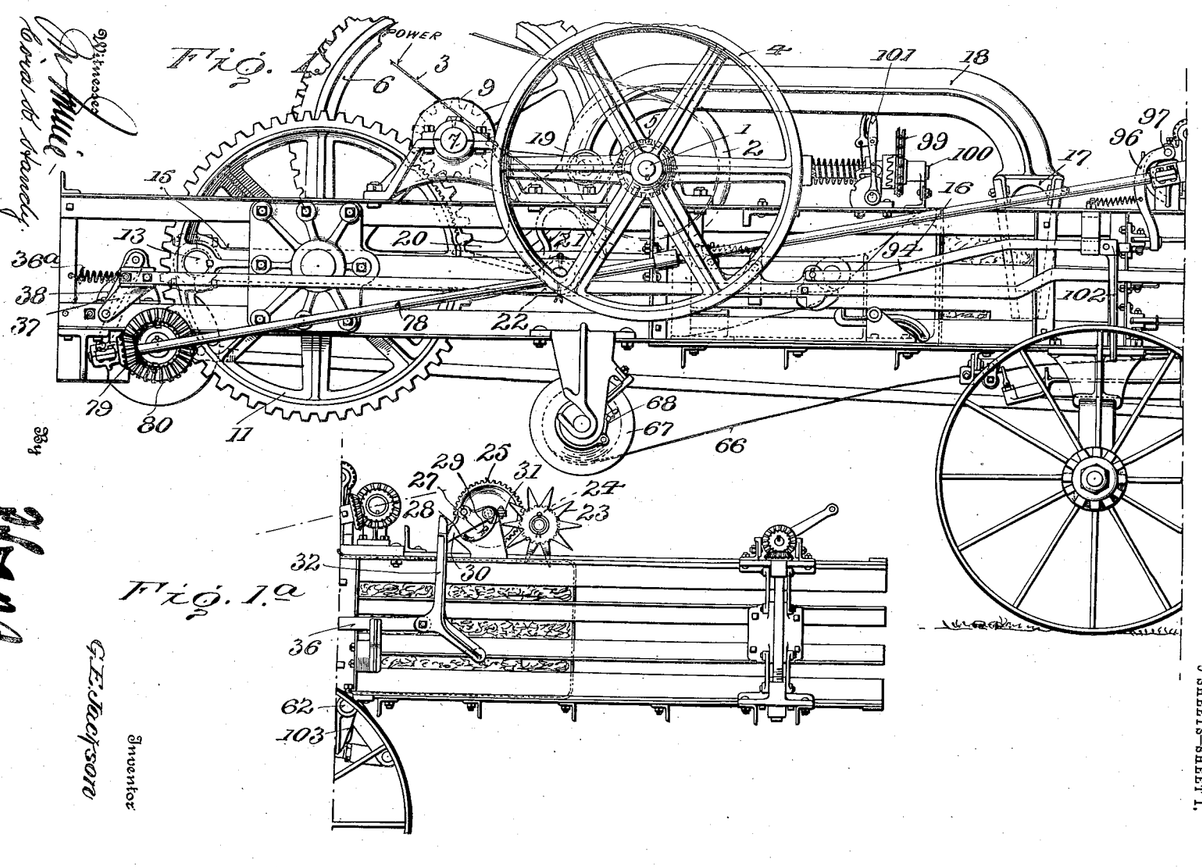
Figs. 2 and 2ª are top plan views of different portions of the press.
Figure 2:
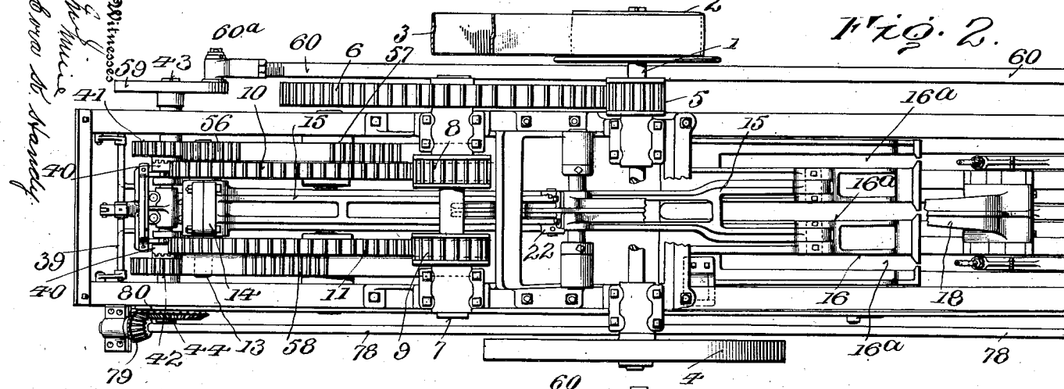
Figure 2A:
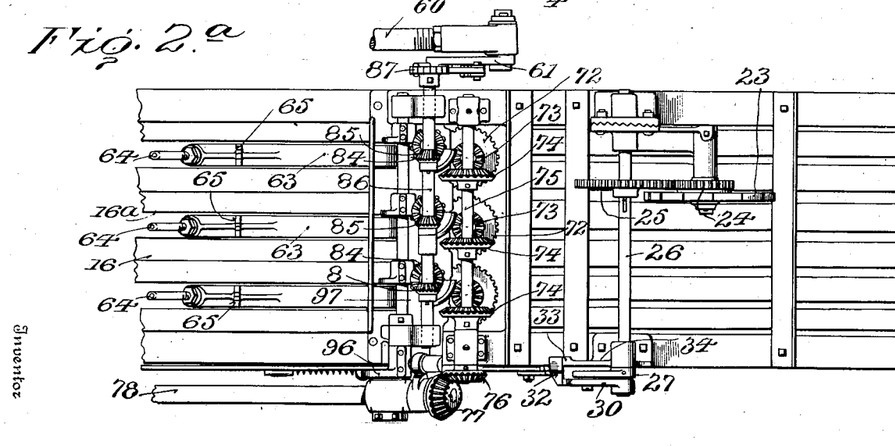

My invention comprises means whereby when the bale has reached a predetermined size, a clutch will be so set in operation as to bring into play the wire-twisting mechanisms. This means consists of a star wheel 23 which is mounted on the same shaft with a relatively small spur pinion 24, the prongs of the star wheel working into the baled material so that the said wheel will have an intermittent rotary movement imparted to it as the material is being fed into the baling chamber and compressed therein. The spur pinion 24 meshes with a relatively large spur pinion 25 which is mounted on a transversely extending shaft 26 as best seen in Figs. 2ª, 3 and 4. The shaft 26 carries at one end a bracket 27 formed with lugs 28 and 29 (see Fig. 1ª). A pivoted dog 30 is carried by the bracket 27 and is weighted at one end and formed with a shoulder 31 designed to rest upon or against the lug 29, as the shaft 26 is turned through the instrumentality of the star wheel 23 and its correlated parts. The dog 30 during a portion of the movement of said shaft will rest against the lug 29 and the forward end of the dog will be free from engagement with the other lug 28; but when the bale has reached the required size, the dog 30 will have brought its nose up against the rear side of a lever 32 and then the lug 28 will engage the rear edge of the dog or push the same against the rear face of said lever and shove the hooked upper end of said lever off of the extended edge 33 of the bearing standard 34 in which one end of the shaft 26 is journaled. The lever 32 is formed with a weighted end 35, and is pivoted as shown to the front end of an operating rod 36. As the lever is then pushed from its support on the standard 34, it and the operating rod 36 will be permitted to lower or drop so as to come into the path of movement of a lug 47 carried on the plunger 16, which will pull the operating rod 36 forwardly for a purpose to be presently explained. The operating rod 36 is provided at its rear end with a casting 37. The said casting is pivotally connected to the crank 38 of a transversely extending clutch shaft 39. A spring 36ª is connected to the rear end of the operating rod 36 and some stationary portion of the framework, the said spring exerting a tension on said rod to pull it rearwardly. The clutch 39 is operatively connected to clutches 40 and is arranged in any suitable way to throw said clutches positively into engagement with the gear wheels 41 and 42 (see Fig. 2) whenever the rod 36 is pulled forwardly. These gear wheels 41 and 42 are mounted loose on their shafts 43 and 44, and when coupled to the shafts serve to operate the wire feeding and twisting mechanisms, which will be hereinafter specifically set forth.

Preparatory to describing the wire feeding and twisting mechanisms, I shall describe how the operating rod 36 is actuated, reference being particularly had to Figs. 3, 4, 7 and 8. The operating rod 36 carries a casting 45 which is fastened thereto by bolts or other similar devices. A trip arm 46 is pivotally connected to the casting 45 to swing about a substantially horizontal axis, the downwardly extending end of said arm being designed to be struck by the above mentioned lug 47 which is secured to and which projects laterally from the plunger or ram 16. A trigger 48 in the form of a bell crank lever is fulcrumed on the casting 45 in the rear of the trip arm 46, the forwardly extending arm of said trigger normally engaging the upper end of the trip arm. A spring 50 serves to hold these parts in normal engagement. As the plunger moves forwardly, after the operating rod 36 has been lowered as before described, the lug 47 of the plunger will engage the trip arm 46 and pull the operating rod 36 forwardly. In this forward movement of the parts, the upwardly extending arm 48 of the trigger will engage an abutment 51, secured to the press framework, just after the operating rod has been pulled forwardly far enough to effect the engagement of its lug 52 with a pivoted gravity latch 53, whereupon, in the continued forward movement of the plunger, the trigger 48 will be swung out of engagement with the trip arm 46 and the lug 47 will be permitted to pass the pivoted trip arm 46, the spring 36ª instantly pulling the operating rod 36 rearwardly to effect the firm engagement of the lug 52 with the latch 53. It will thus be seen that the plunger will be permitted to continue its forward movement independently of the operating rod 36 while said rod is held at the forward limit of its movement by the latch 53 in a position to hold the clutches 40 thrown in. As the plunger thus continues this forward movement, it is also permitted to pass a swinging block 54 which is carried by the casting 45 which is permitted a free forward movement, the rearward movement of said block being limited by contact with a lug 55 formed on the inner face of the casting 45. Up to this point then, I have described how, when a bale reaches a predetermined size, the operating rod 36 will be automatically dropped so that upon the next forward movement of the plunger, the said plunger will pull the operating rod 36 forwardly and throw in the clutches for the wire twisting and feeding mechanisms. I shall now describe such mechanisms and the means for actuating the same.

Referring to Fig. 2 it will be seen that the relatively large gear wheel 10 is formed on its outer face with two segments 56 and 57 spaced from each other, and that the corresponding gear wheel 11 is formed with a similar segment 58 so mounted as to operate after the segment 56 has operated and before the segment 57 has operated. The segments 56 and 57 are designed respectively for raising and lowering the needle carrying arms, and they are both designed to successively engage the gear wheel 41 to turn the shaft 43 after such gear wheel 41 has been coupled to said shaft. The shaft 43 carries at its outer end a crank disk 59 to which the rear end of the connecting rod 60 is secured by a wrist pin 60ª. The connecting rod 60 extends forwardly along one side of the framework and is connected at its front end to the crank 61 of a shaft 62 journaled to oscillate about its longitudinal axis. Mounted upon the shaft 62 are arms 63 provided at their outer ends with needles 64 and also provided with wire guides 65 in alinement with the needles. 66 designates the wires that are first passed by hand through the needles 64 and that are unwound from coils, spools or the like 67 journaled in hangers depending from the press framework.

Figures 5, 6:
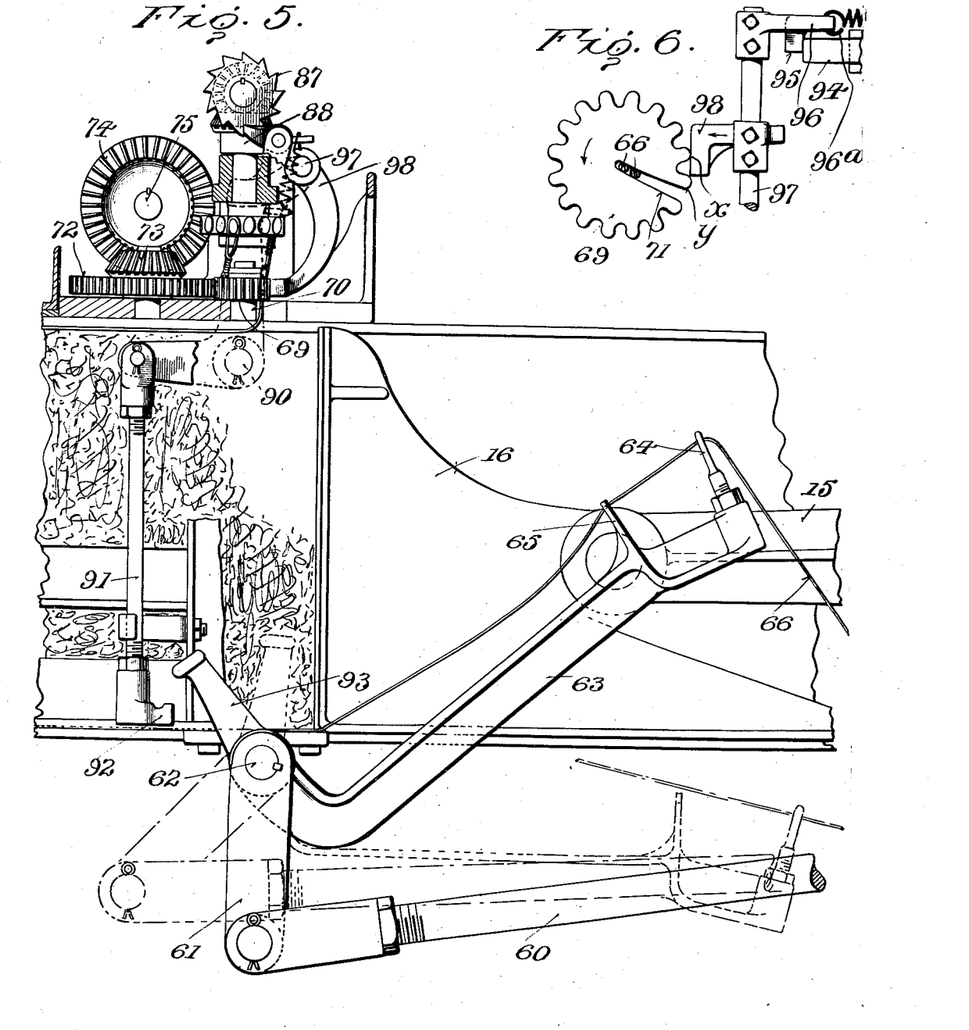
Fig. 5 is an enlarged side elevation of a portion of the press, parts being shown broken away and other parts being shown in dotted lines.
Fig. 6 is a detail top plan view of one of the twister pinions.
Figures 7, 8, 9:
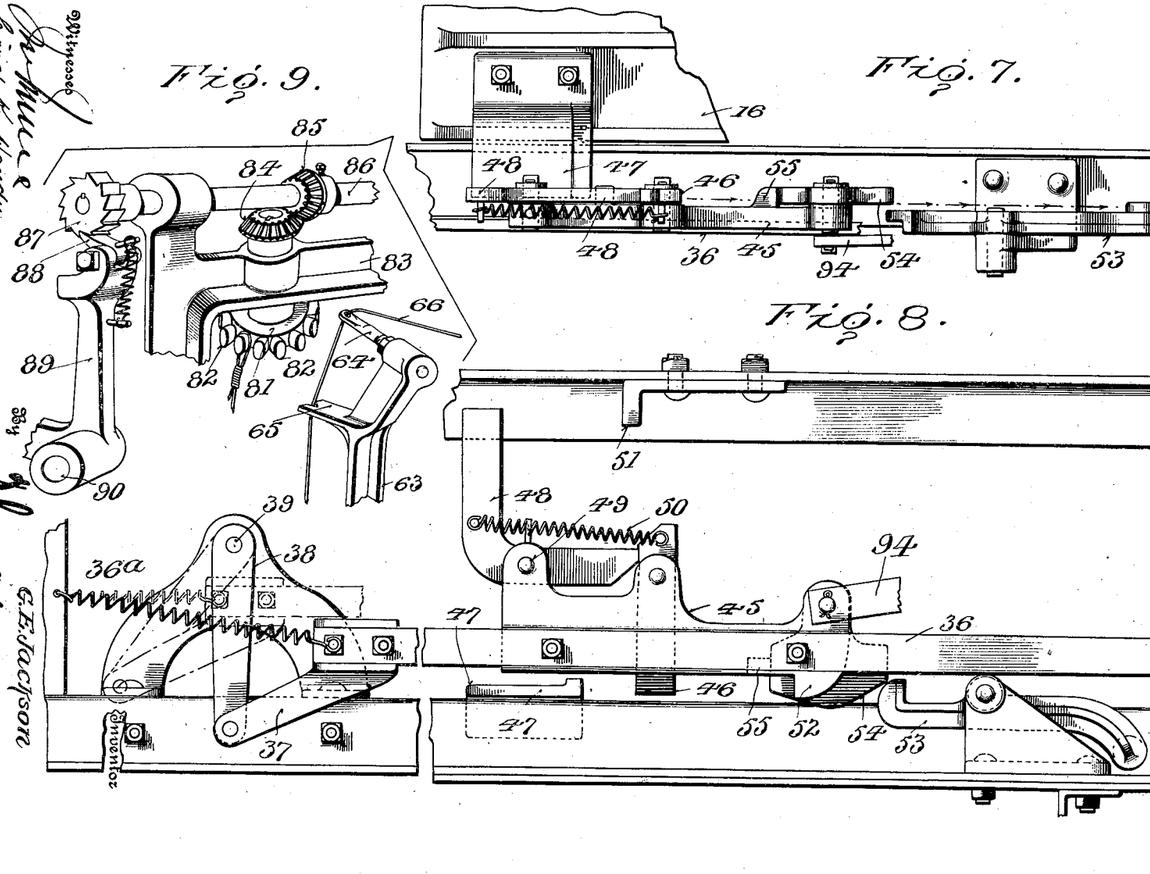

68 designates tensioning devices of any desired character intended to prevent a too free movement of the spools or coils, so as to prevent the wire from becoming slack. The needles 64 carry the wires up to the twisters 69, there being one twister for each wire, the said twisters being mounted to rotate about vertical axes on stub shafts 70 mounted in any desired way on the framework. Each twister pinion is formed with a radial slot 71 which is of a width to permit the insertion of two strands of wire and narrow enough to prevent said strands from passing each other in the slot, whereby as the pinions rotate, after two wires have been fed therein, they will twist the wires in an obvious manner. The twister pinions 69 are caused to rotate simultaneously by means of gear wheels 72 which mesh therewith, and the said gear wheels 72 are rotated by means of bevel pinions 73 fast with said wheels, said bevel pinions meshing with vertically disposed bevel pinions 74 all keyed or otherwise secured upon a transverse shaft 75. The shaft 75 is provided at one end with a bevel pinion 76 meshing with a corresponding pinion 77 on the forward end of a forwardly and upwardly extending actuating shaft 78. This shaft is provided at its rear end with a pinion 79 meshing with a pinion 80 secured to the shaft 44. Hence it will be understood that the shaft 78 is turned to rotate the twister pinions, through the instrumentality of the segment 58 meshing with the gear wheel 42, after the segment 56 has effected the raising of the needle carrying arms and before the segment 57 has effected the lowering of said arms. That is to say, the twisters will be operated while the needles hold the wires therein, it being understood that the twisting is performed on those portions of the wires that are located between the needles 64 and the guides 65, as the parts are so arranged that the pinions will lie between the needles 64 and guides 65 when the needle carrying arms 63 are in the upper position. Coacting with the wire twisting pinions 69 are a series of wire holders 81, said wire holders being provided with a plurality of radially extending pins 82, and being journaled to rotate about vertical axes in an arched bar 83 mounted upon the framework. The several pin wheels or wire holders 81 are provided at the upper ends of their shafts with bevel pinions 84 meshing with pinions 85 secured to a transverse shaft 86, said shaft being journaled in standards formed on the arched bar 83, as best seen in Fig. 9. The shaft 86 is provided at one end with a ratchet wheel 87, said ratchet wheel being designed to be engaged by a spring pressed pawl 88 carried by the upper arm of a bell crank lever 89, said lever being fulcrumed at 90 as indicated in Figs. 5 and 9. A vertically extending rod 91 is pivotally connected at its upper end to the horizontally extending arm of the bell crank lever 89, and the lower end of said rod carries a recessed bracket 92 designed for engagement with a finger 93 secured to and projecting perpendicularly from the shaft 62.

Figure 3:
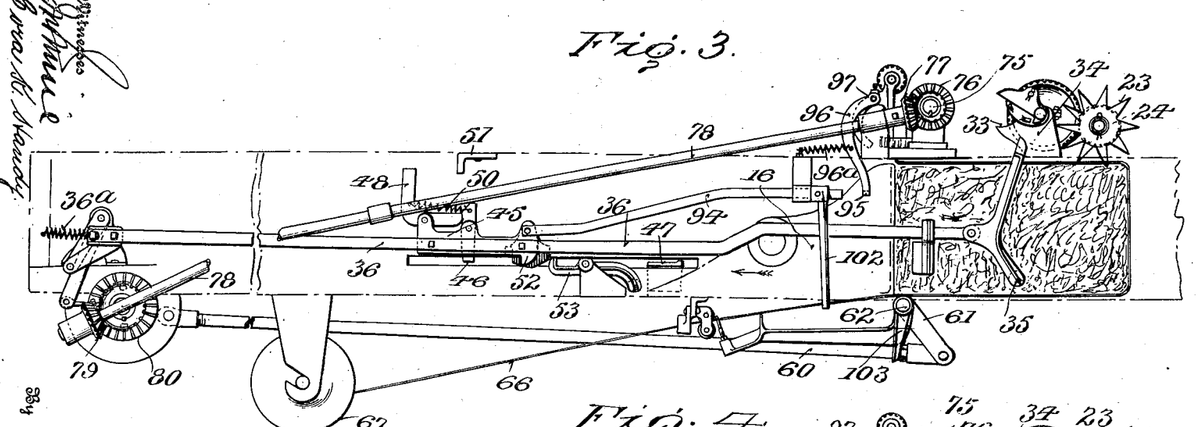
Figs. 3 and 4 are side elevations in the nature of diagrammatic views, illustrating the mechanism with the parts in different operative positions.
Figure 4:
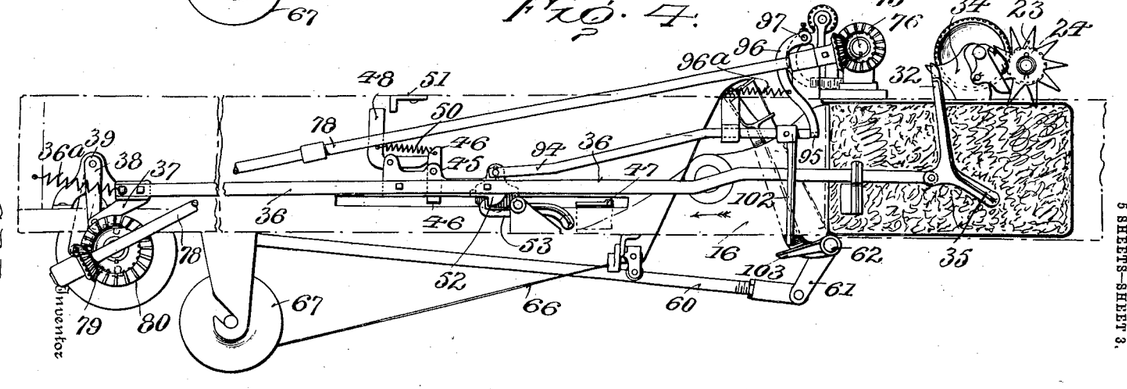

As best seen in Figs. 1, 3 and 4 a push rod 94 is pivotally connected at its rear end to the casting 45 and extends upwardly and forwardly therefrom and is designed to be brought into engagement with the inwardly extending end 95 of a depending arm 96 secured to a transverse shaft 97. This shaft carries a series of tappets 98 designed for engagement with the respective twister pinions 69. It is to be understood that the parts are so arranged as to bring the twister pinions around to the relative position illu trated in Fig. 6 after the twisting operation has been completed. Then upon the next forward movement of the operating rod 36 as before described, the front end of the push rod 94 will engage the arm 96 and rock the rod 97 so as to cause the tappets 98 to press upon the teeth X of the several pinions, thereby turning said pinions until said tappets bear against the teeth Y, insuring that the pinions will be adjusted so that their slots 71 will be in proper position to receive the wire subsequently fed to them by the needles. As the needles are brought up to them by the turning of the shaft 62, an arm 103 also carried by said shaft will be brought into engagement with a depending arm 102 secured to the front end of the push rod 94 and this will push said rod upwardly and free its forward end from the inturned end of the arm 96, the spring 96ª then at once acting upon said arm to rock the shaft 97 rearwardly so as to release the tappets from the twister pinions, in order that said pinions may then be entirely free to be rotated by the revolution of the shaft 75, and thus twist the wires. 99 designates a sprocket chain which is designed to operate the laterally extending feed mechanism such as an endless conveyer or the like (not shown), the sprocket wheel of said chain that is mounted on the shaft 100 being normally loose thereon and being coupled thereto by means of an actuating clutch 101, this mechanism being provided so that the operator may stop the feed actuating mechanism whenever desired.

At the beginning of the practical operation of my improved baling press, the wires are fed by hand up through the needles 64 and are looped around one of the pins of the respective wire holders 81, and it is then to be assumed, in describing the subsequent operation of the parts that the needle carrying arms have been swung down to their lowermost positions. As the hay or other material to be baled is fed into the baling chamber of the press, it is packed therein by the fork 17 and compressed by the plunger or ram 16, it being understood that at the beginning of the operation the lever 32 is locked over the extended end 33 of the standard 34, so that the operating rod 36 will be held in an inoperative position relative to the lug 47 of the plunger. The operating rod, it is also to be understood, is held at the rearward limit of its movement by the spring 36ª and consequently the clutches 40 are thrown out. As the material is compressed in the baling chamber, an intermittent movement will be imparted to the star wheel 23, and when the bale reaches a predetermined size, the dog 30 will push the lever 32 from off the standard 34, thereby causing the operating rod 36 to drop. This position of the parts is illustrated in Fig. 3, this view also showing that the plunger may be at the forward limit of its movement at this time. In the next rearward traverse of the plunger or ram, it is obvious that it will engage the pivoted block 54, and the lug 47 will ride underneath the beveled forward face of said block thereby raising the operating rod 36. But, as at this time, the said rod is at the rear limit of its movement, as indicated by dotted lines in Fig. 8, and as consequently it is in a less inclined position than it would be if it were at the forward limit of its movement, as illustrated in full lines in Figs. 8 and 4, an engagement of the lug 47 with the block 54 will raise the forward end of the operating rod 36 a distance insufficient to carry the hooked upper end of the lever 32 back upon the extended end of the standard 34. It will just fall short of being carried up over the point of said standard. Hence the operating rod will continue in its lowered position as the plunger moves rearwardly. In the succeeding forward stroke of the plunger, the lug 47 thereof will engage the trip arm 46 and pull the operating rod 36 forwardly. As soon as this movement has continued far enough to insure that the lug 52 has passed the hooked end of the latch 53, the trigger 48 will be engaged by the abutment 57 and will be sprung to release the trip arm 46 thereby permitting the plunger to continue its forward movement independent of the operating rod 36, the said rod being caught and held by the engagement of the latch 53 with the lug 52. Then the plunger, in its continued forward movement will also pass the block 54 which is permitted to have a free forward swing, and as soon as the plunger reaches the forward limit of its movement, the wire feeding and twisting operations will take place, it being of course understood that the forward movement of the operating rod 36 has thrown in the clutches 40. As the push rod 94 is carried forwardly by the operating rod 36, it will rock the shaft 97 and turn the twisters so that their slots will properly register with the wires which are at once fed into them; and, immediately following this movement of the twister pinions, the arms 63 will be swung upwardly so as to carry the wires around the bales, wires being fed into the needles 64 and in the wire guides 65. Simultaneously and commensurate with the movement of the needle carrying arms 63, is the movement of the wire holders 81 effected by the pawl and ratchet mechanism illustrated in Figs. 5 and 9 so that the wires will be held above the twister pinions by being looped over the pins of the wire holders and will be held below the pinions by the wire guides 65. Immediately upon the passage of wires into the slots 71 of the twister pinions, the bracket 103 will push upwardly on the depending arm 102 and release the push rod 94 from the arm 96, the spring 96ª thereupon acting to release the tappets 98 from the twister pinions, permitting said pinions to freely rotate through the instrumentality of the actuating shaft 78. As soon as said shaft has acted and the segment 58 has passed out of engagement with the gear wheel 42, the segment 57 will come into action and effect the second half of the revolution of the crank disk 59 to lower the needle carrying arms, while just preceding this movement, the shaft 78 has acted to cut the wires by wire cutting devices such as those illustrated in Letters Patent of the United States #919,585, granted to me April 27, 1909.

After the needles have been lowered, the plunger instantly commences its rearward traverse and, in so doing, its lug 47 engages the beveled edge of the block 54 and thereby raises the operating rod 36 so as to disengage the lug 52 from the latch 53 thereby permitting the said operating rod to be pulled rearwardly and throw the clutches 40 out, the upward movement of the operating rod also being at this time sufficient to carry the hooked upper end of the lever 32 above the extended upper end of the standard 34, because at this time, the rod 36 is in the full line position illustrated in Fig. 8, and is more inclined than it would be if it were at the rear limit of its movement, and its front end is therefore higher. Hence the weighted end of the lever 32 will cause the upper end of said lever to engage with said standard so as to hold the operating rod in an elevated inoperative position until the next bale is formed. In this upward movement of the operating rod and lever, the weighted end of said lever will cause the hooked upper end to ride under the lower rear edge of the standard until the point of the latter has been reached and will thus cause said hooked end to engage the surface 33. As the clutches 40 are now thrown out, the press will feed in and compress, while the wire feeding and twisting mechanisms are in inoperative positions, until the next bale reaches the required size.

It is to be particularly noted that the wire feeding and twisting operations are performed with the plunger at the forward compressing end of its stroke, the plunger being formed with longitudinally extending slots 16ª for the passage of the needles and needle carrying arms, as clearly illustrated in Figs. 2 and 2ª, and indicated also in Figs. 4 and 5. Hence the operation of my baling press is a continuous one, material being fed into the press at each backward stroke of the plunger and being automatically baled after the compressed charge has reached a predetermined size.

Having thus described the invention, what is claimed as new is:

1. In a baling press, the combination of compressing mechanism, means for actuating the same, a wire holder, a wire twister, means for actuating said wire twister, a needle arranged to feed the wire to the wire holder and twister, an arm carrying said needle, a shaft carrying said arm and arranged to move the same toward and from the wire holder and twister, and means carried by said shaft for intermittingly turning the wire holder upon the movement of said shaft in a direction to carry the needle toward the holder and twister.

2. In a baling press, the combination of compressing mechanism, means for actuating the same, a rotatable wire holder, a wire twister, means for actuating said twister, a needle adapted to carry the wire to the holder and twister an arm carrying said needle, means carrying said arm and adapted to move the same in a direction to carry the needle toward and away from the wire holder and twister, and means secured to the arm carrying means arranged to intermittently move the wire holder upon the movement of the needle toward the same.

3. In a baling press, the combination of compressing mechanism, means for actuating the same, a rotatable wire holder, a wire twister, means for actuating said wire twister, a needle adapted to carry the wire to the twister and wire holder, a swinging arm carrying the needle, a shaft upon which said arm is mounted, means for turning said shaft, another shaft, said last named shaft having a connection with said wire holder to turn the same, a ratchet carried by said last named shaft, a pawl meshing with said ratchet, a bell crank one arm of which carries the pawl, a rod suspended from the other arm of said bell crank, a bracket secured to said rod and another arm, said last named arm being movable with the shaft which carries the needle carrying arm and being adapted to engage said bracket in the movement of the needle toward the twister and wire holder, whereby to move said rod downwardly and rock the bell crank in a direction to turn the wire holder.

4. In a baling press, the combination of compressing mechanism, means for actuating the same, a rotatable wire holder, a wire twister, means for actuating the wire twister, a pinion movable with the wire holder, another pinion meshing with said first named pinion, a shaft carrying said last named pinion, a ratchet secured to said shaft, a pawl meshing with said ratchet, a bell crank one arm of which carries said pawl, a rod pivotally connected to the other arm of said bell crank, a bracket carried by said rod, a needle adapted to carry the wire up to the wire twister and holder, another arm to which the needle is connected, a shaft upon which said arm is mounted, and another arm extending from said shaft and movable therewith, said last named arm being adapted to engage the bracket so as to rock the bell crank upon the movement of the needle toward the wire twister and holder.

5. In a baling press, the combination of compressing mechanism including a plunger, means for actuating said plunger, wire holding and twisting mechanisms, means for actuating said mechanisms, and means for setting said actuating means into operation, said last named means including an operating rod, a casting secured to the rod, a pivoted trip arm carried by said casting, the plunger being provided with a lug adapted to engage the trip arm and move the rod forwardly in the forward movement of the plunger, a trigger carried by said casting and arranged to hold said trip arm from a pivotal movement, means for automatically holding and engaging the operating rod at the forward limit of its movement, and means for automatically releasing the trigger from the trip arm upon the engagement of the operating rod with its holding means.

6. In a baling press, the combination of compressing mechanism including a plunger, means for actuating said plunger the plunger being provided with a lug, wire feeding and twisting mechanisms, means for actuating said mechanisms, and means for setting said actuating means into operation, said last named means including an operating rod, a casting secured to said rod, means for lowering said rod, a trip arm carried by said casting and arranged in the path of movement of said lugs in the lowered position of the rod, a trigger carried by said casting and arranged to hold said trip arm from moving, means for automatically engaging and holding the operating rod at the forward limit of its movement, and means for automatically releasing the trip arm upon the engagement of said means with the operating rod.

7. In a baling press, the combination of compressing mechanism including a plunger, means for actuating said plunger, wire feeding and twisting mechanisms, means for actuating said mechanisms, and means for automatically setting said actuating mechanisms into operation at a predetermined point in the formation of a bale, said last named means including an operating rod and a lug formed on the plunger and arranged to operatively engage with said rod at the beginning of the forward movement of the plunger, and means for automatically disengaging the plunger from said rod just prior to the completion of the forward stroke of the plunger.

8. In a baling press, the combination of compressing means including a plunger, means for actuating said plunger, wire feeding and twisting mechanisms, means for actuating said wire feeding and twisting mechanisms, means for setting said actuating means into operation, said last named means including an operating rod arranged to be engaged by the plunger in the forward stroke thereof, means for supporting said rod in an inoperative relation to the plunger, means for holding said rod at the forward limit of its movement, and means whereby a rearward stroke of the plunger prior to the engagement of the plunger with such holding means, will move the operating rod into engagement with its supporting means aforesaid.

9. In a baling press, the combination of compressing mechanism, means for actuating the same, a wire holder, a wire twister, means for actuating said wire twister, means for feeding wire to the wire holder and twister, said means including a needle, and an arm carrying said needle, a shaft upon which said arm is mounted, and means for rocking said shaft, a finger secured to said shaft, an arm arranged to be engaged by said finger upon the movement of said shaft in one direction, a rod carrying said arm, a bell crank from which said rod is suspended, a pawl carried by one end of said bell crank, a ratchet with which said pawl engages, a shaft carrying said ratchet, and a gearing connection between said last named shaft and said wire holder.

10. In a baling press, the combination of compressing mechanism, means for actuating the same, a wire twisting pinion, means for rotating the same, said pinion being formed with a slot for the reception of wire, means movable in a definite plane for carrying the wire into said slot, means for actuating said wire carrying means, and means independent of the rotating means for the pinion, for turning said pinion and bringing its slot into the plane of movement of the wire carrying means.

11. In a baling press, a twister pinion, means for rotating the same, a tappet designed to engage the pinion to turn it independently of said rotating means, a shaft carrying said tappet, and means for automatically turning said shaft.

12. In a baling press, the combination of compressing mechanism, means for actuating the same, a wire twisting pinion, a tappet designed to move said pinion, means for feeding wire to said pinion, a shaft upon which said tappet is mounted, a crank arm secured to said shaft, a push rod arranged to strike said crank arm whereby to rock the shaft, means for rotating said pinion, and means for automatically releasing the push rod from the crank arm and for returning the shaft to normal position just prior to the rotation of the pinion.

13. In a baling press, a twister pinion, means for intermittingly rotating the same, and independent means for engaging and rotating said pinion one tooth at a time.

14. In a baling press, a twister pinion, means for rotating said pinion, a tappet designed to engage the toothed edge of the pinion so as to move the same a distance of one tooth independent of the pinion rotating means, and means for actuating said tappet.

15. In a baling press, the combination of compressing mechanism, means for actuating the same, a wire twisting pinion, a tappet designed to move said pinion, means for feeding wire to the pinion, a shaft upon which said tappet is mounted, a crank arm secured to said shaft, a push rod arranged to strike said crank arm whereby to rock the shaft, means for rotating said pinion, and means movable by and with the wire holding means for disengaging the push rod from the crank arm, and for returning the shaft to normal position just prior to the rotation of the pinion.

16. In a baling press, the combination of compressing mechanism, means for actuating the same, a wire twisting pinion, a tappet designed to move said pinion, a shaft upon which said tappet is mounted, a crank arm secured to the shaft, a push rod arranged to strike the crank arm whereby to rock the shaft, means for rotating said pinion, a needle adapted to feed wire to said pinion, an arm carrying said needle, a shaft upon which said arm is mounted, means for rotating said pinion, a push rod arranged to strike the crank arm whereby to engage the first named shaft, an arm depending from the push rod, and another arm carried by said second named shaft and adapted to strike said depending arm whereby to release the push rod from the crank arm during the movement of the needle toward the wire twisting pinion.

17. In a baling press, the combination of compressing mechanism including a plunger, wire-feeding mechanism, wire-twisting mechanism, and means controlled by said plunger for actuating said wire-feeding and wire-twisting mechanisms, with the plunger at the end of its compressing stroke.

18. In a baling press, the combination of packing mechanism, compressing mechanism including a plunger, wire-feeding mechanism, wire-twisting mechanism, means controlled by said plunger for actuating said wire-feeding and wire-twisting mechanisms with the plunger at the end of its compressing stroke, and means for operating said packing mechanism at each rearward stroke of said plunger.

19. In a baling press, the combination of compressing mechanism including a plunger, wire feeding mechanism, wire-twisting mechanism, means for actuating said wire feeding and wire twisting mechanisms with the plunger at the end of its compressing stroke, a pivotally mounted beam provided at one end with a packing head, and connections whereby said plunger positively actuates said packing beam at each rearward stroke of the plunger.

20. In a baling press, the combination of compressing mechanism including a plunger provided with a vertical slot, a rigid needle-carrying arm, a fixed pivot underneath the baling chamber for pivotally supporting said arm so as to cause it to swing about its pivot and upwardly in the arc of a circle to pass through the slot in the plunger, the baling chamber being provided with a slot in its bottom to accommodate the needle-carrying arm when the same swings into wire-feeding position, a crank for actuating said arm, wire-twisting mechanism and means for actuating said wire-twisting mechanism.

21. In a baling press, the combination of compressing mechanism, wire-twisting mechanism, means for actuating said mechanisms, a wire-holding disk mounted to rotate on a vertical axis, means for automatically feeding the wire to said disk and into said wire-twisting mechanism, and means for intermittently rotating said wire-holding disk.

22. In a baling press, the combination of compressing mechanism, wire-twisting mechanism, means for actuating said mechanisms, a wire-holding disk mounted to rotate on a vertical axis, means for feeding a wire to said disk and into said twisting-mechanism, and means for rotating said wire-holding disk simultaneously with the operation of said feeding means.

23. In a baling press, the combination of compressing mechanism, wire-twisting mechanism, means for actuating said mechanisms, a rotatable wire-holding disk arranged in vertical alinement with said twisting mechanism, a pivotally mounted arm, a needle carried by said arm to feed the wire to said wire-holding disk and into said wire-twisting mechanism, means for swinging said arm about its pivot into operative position, and means for positively rotating said wire-holding disk simultaneously with the operation of said arm.

24. In a baling press, the combination of compressing mechanism including a plunger, means for actuating said plunger, wire-feeding mechanism, wire-twisting mechanism, means for holding said wire-feeding and wire-twisting mechanisms inoperative, means controlled by said plunger for automatically setting said wire-feeding and wire-twisting mechanisms into operation upon the forward movement of the plunger, means for permitting a definite forward movement of said plunger just prior to the completion of its forward stroke independent of said setting means, said wire-feeding and wire-twisting mechanisms being operated with the plunger at the end of its forward or compressing stroke.

25. In a baling press, the combination of compressing mechanism including a plunger, means for actuating said plunger, wire-twisting mechanism, mechanism for feeding a wire to said twisting mechanism, means for actuating said wire-feeding mechanism to operative and inoperative positions, means for actuating said wire-twisting mechanism after the movement of said wire-feeding mechanism to operative position and prior to the movement of said wire-feeding mechanism to inoperative position, and means controlled by the plunger during its forward stroke for automatically setting said wire-feeding and wire-twisting mechanisms into operation at a predetermined point in the formation of a bale, said wire-feeding and wire-twisting mechanisms being operated with the plunger at the end of its forward or compressing stroke.

26. In a baling press, the combination of compressing mechanism, means for actuating the same, a horizontally rotatable wire-holder, an actuating shaft operatively connected to said wire-holder, a horizontally rotatable wire-twister arranged below said wire-holder, means for feeding the wire to said wire-holder and into said wire-twister, means for actuating said twister, a pawl-and-ratchet mechanism arranged to impart an intermittent rotary movement to said shaft, and means for actuating said pawl-and-ratchet mechanism.

27. In a baling press, the combination of compressing mechanism, means for actuating the same, a rotatable wire-holder, an actuating shaft operatively connected to said wire-holder, a wire-twister, means for feeding the wire to said wire-holder and into said wire-twister, means for actuating said twister, a pawl-and-ratchet mechanism arranged to impart intermittent rotary movement to said shaft, and means for actuating said pawl-and-ratchet mechanism simultaneously with the operation of said wire-feeding means.

In testimony whereof I affix my signature in presence of two witnesses.

GEORGE E. JACKSON. [L. S.]

Witnesses:
HENRY LUTJOHAN,
THEADOR LAND.